(12) United States Patent
Song et al.

(10) Patent No.: US 12,488,281 B2
(45) Date of Patent: Dec. 2, 2025

(54) ELECTRONIC DEVICE AND CONTROL METHOD THEREOF

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Wonseok Song, Suwon-si (KR); Wonchul Son, Suwon-si (KR); Wonjun Hwang, Suwon-si (KR); Gangmo Koo, Suwon-si (KR); Youngbin Kim, Suwon-si (KR); Youngsu Moon, Suwon-si (KR); Huijung Lee, Suwon-si (KR); Younghun Jo, Suwon-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1062 days.

(21) Appl. No.: 17/497,193

(22) Filed: Oct. 8, 2021

(65) Prior Publication Data

US 2022/0027791 A1 Jan. 27, 2022

Related U.S. Application Data

(63) Continuation of application No. PCT/KR2021/000891, filed on Jan. 22, 2021.

(30) Foreign Application Priority Data

Mar. 10, 2020 (KR) .................. 10-2020-0029849
Sep. 7, 2020 (KR) .................. 10-2020-0114122

(51) Int. Cl.
*G06N 3/04* (2023.01)
*G06N 3/08* (2023.01)
(Continued)

(52) U.S. Cl.
CPC ............... *G06N 20/00* (2019.01); *G06N 3/04* (2013.01); *G06N 3/08* (2013.01); *G06N 5/02* (2013.01)

(58) Field of Classification Search
CPC .. G06N 3/04; G06N 3/08; G06N 5/02; G06N 20/00
See application file for complete search history.

(56) References Cited

U.S. PATENT DOCUMENTS 10,410,114 B2 9/2019 Kang et al.
11,024,009 B2 6/2021 Shi et al.
(Continued)

FOREIGN PATENT DOCUMENTS

CN 108830288 11/2018
JP 2019-067078 4/2019
(Continued)

OTHER PUBLICATIONS

Sungsoo Ahn, etc., "Variational Information Distillation for Knowledge Transfer", published via arXiv on Apr. 11, 2019, retrieved Oct. 28, 2024. (Year: 2019).*

(Continued)

*Primary Examiner* — Shourjo Dasgupta
(74) *Attorney, Agent, or Firm* — Nixon & Vanderhye, P.C.

(57) ABSTRACT

An electronic device is disclosed. The electronic device may comprise: a memory in which information on a first artificial intelligence model learned through first learning data and information on a second artificial intelligence model learned through the first learning data are stored; and a processor
(Continued)

connected to the memory to control the electronic device, wherein the processor is configured to: input second learning data to each of the first artificial intelligence model and the second artificial intelligence model and relearns the second artificial intelligence model on the basis of an output of each of a plurality of first layers included in the first artificial intelligence model and an output of each of a plurality of second layers included in the second artificial intelligence model, each of the plurality of first layers includes a plurality of two-dimensional filters, and each of the plurality of second layers includes a plurality of filters obtained by reducing the size of each of the plurality of two-dimensional filters of a corresponding first layer.

14 Claims, 17 Drawing Sheets

(51) Int. Cl.
  *G06N 5/02* (2023.01)
  *G06N 20/00* (2019.01)

(56) References Cited

U.S. PATENT DOCUMENTS

| | | | | |
|---|---|---|---|---|
| 2017/0083829 | A1* | 3/2017 | Kang | G06N 3/045 |
| 2018/0268292 | A1 | 9/2018 | Choi et al. | |
| 2018/0336465 | A1* | 11/2018 | Kim | G06N 3/045 |
| 2018/0365564 | A1* | 12/2018 | Huang | G06N 3/045 |
| 2019/0051290 | A1* | 2/2019 | Li | G10L 15/063 |
| 2019/0180177 | A1 | 6/2019 | Yim et al. | |
| 2020/0104642 | A1 | 4/2020 | Wei et al. | |
| 2020/0272905 | A1* | 8/2020 | Saripalli | G06N 3/082 |
| 2020/0356853 | A1 | 11/2020 | Kim et al. | |
| 2021/0182660 | A1* | 6/2021 | Amirguliyev | G06N 3/084 |
| 2021/0182661 | A1* | 6/2021 | Li | H04L 41/16 |
| 2021/0264237 | A1 | 8/2021 | Kim et al. | |
| 2022/0343163 | A1* | 10/2022 | Takamoto | G06N 3/084 |

FOREIGN PATENT DOCUMENTS

| | | |
|---|---|---|
| KR | 10-2017-0034258 | 3/2017 |
| KR | 10-2019-0068255 | 6/2019 |
| KR | 10-2020-0129457 | 11/2020 |
| KR | 10-2190303 | 12/2020 |
| KR | 10-2021-0106217 | 8/2021 |
| WO | 2018-223822 | 12/2018 |

OTHER PUBLICATIONS

Gaurav Kumar Nayak, etc., "Zero-Shot Knowledge Distillation in Deep Networks", published via arXiv on May 20, 2019, retrieved Oct. 28, 2024. (Year: 2019).*
Jiao Xie, etc., "Training convolutional neural networks with cheap convolutions and online distillation", published via arXiv on Oct. 10, 2019, retrieved Oct. 28, 2024. (Year: 2019).*
Haoran Zhao, etc., "Highlight Every Step: Knowledge Distillation via Collaborative Teaching", published via arXiv on Jul. 23, 2019, retrieved Oct. 28, 2024. (Year: 2019).*
Prakhar Ganesh, etc., "Knowledge Distillation: Simplified", published on Aug. 12, 2019 to https://towardsdatascience.com/knowledge-distillation-simplified-dd4973dbc764, retrieved Oct. 28, 2024. (Year: 2019).*
Sajjad Abbasi, etc., "Modeling Student-Teacher Techniques in Deep Neural Networks for Knowledge Distillation", published via arXiv on Dec. 31, 2019, retrieved Oct. 28, 2024. (Year: 2019).*
Random Nerd, "Transfer Learning—Reusing a pre-trained Deep Learning model on a new task", published on Dec. 18, 2018 to https://medium.com/analytics-vidhya/reusing-a-pre-trained-deep-learning-model-on-a-new-task-transfer-learning-1c0a25a92dfb, retrieved Oct. 29, 2024. (Year: 2018).*
Jason Brownlee, "A Gentle Introduction to Transfer Learning for Deep Learning", published Sep. 16, 2019 to https://machinelearningmastery.com/transfer-learning-for-deep-learning, retrieved Oct. 29, 2024. (Year: 2019).*
Chenglin Yang, etc., "Training Deep Neural Networks in Generations: A More Tolerant Teacher Educates Better Students", published via the Thirty-Third AAAI Conference on Artificial Intelligence (AAAI-19), retrieved on May 5, 2025 from https://ojs.aaai.org/index.php/AAAI/article/view/4506/4384. (Year: 2019).*
Silvia L. Pintea, etc., "Recurrent Knowledge Distillation", published via 2018 25th IEEE International Conference on Image Processing (ICIP), held Oct. 7-10, 2018 in Athens, Greece, retrieved Jul. 26, 2025. (Year: 2018).*
Jangho Kim, etc., "Paraphrasing Complex Network: Network Compression via Factor Transfer", published to arXiv on Sep. 27, 2018, retrieved Jul. 26, 2025. (Year: 2018).*
Xuan Liu, etc., "Improving the Interpretability of Deep Neural Networks with Knowledge Distillation", published to arXiv on Dec. 29, 2018, retrieved Jul. 26, 2025. (Year: 2018).*
Frederick Tung, etc., "Similarity-Preserving Knowledge Distillation", published via 2019 IEEE/CVF International Conference on Computer Vision (ICCV), retrieved Jul. 26, 2025. (Year: 2019).*
Maarit Widmann, etc., "Seven Techniques for Data Dimensionality Reduction", published May 12, 2015 to https://www.knime.com/blog/seven-techniques-for-data-dimensionality-reduction, retrieved Jul. 26, 2025. (Year: 2015).*
Rinu Gour, "Introduction to Dimensionality Reduction", published Mar. 6, 2019 to https://medium.com/@rinu.gour123/introduction-to-dimensionality-reduction-55d1545fd35d, retrieved Jul. 26, 2025. (Year: 2019).*
Hao-Ting Li, etc., "Layer-Level Knowledge Distillation for Deep Neural Network Learning", published May 14, 2019 to Appl. Sci. 2019, 9, 1966, retrieved Jul. 26, 2025. (Year: 2019).*
Hanting Chen, etc., "Learning Student Networks via Feature Embedding", published Dec. 17, 2018 to arXiv, retrieved Jul. 26, 2025. (Year: 2018).*
Edward Laurence, etc., "Spectral Dimension Reduction of Complex Dynamical Networks", published Mar. 4, 2019 to Physical Review X 9, 011042 (2019), retrieved Jul. 26, 2025. (Year: 2019).*
Chenglin Yang, etc., "Training Deep Neural Networks in Generations: A More Tolerant Teacher Educates Better Students", published on Sep. 7, 2018 to arXiv, retrieved Jul. 26, 2025. (Year: 2018).*
Suzuki et al., "Domain Adaptation and Representation Transfer and Medical Image Learning with Less Labels and imperfect Data", First MICCAI Workshop, Dart 2019 and First International Workshop, MIL3ID 2019 Shenzhen, Held in Conjunction with MICCAI Oct. 13 and 17, 2019, 2019, Proceedings, 267 pages.
Yim et al., "A Gift from Knowledge Distillation: Fast Optimization, Network Minimization and Transfer Learning", 2017 IEEE Conference on Computer Vision and Pattern Recognition, 2017 IEEE, pp. 7130-7138.
Hinton et al., "Distilling the Knowledge in a Neural Network", Mar. 9, 2015, 9 pages.
Romero et al., "Fitnets: Hints for Thin Deep Nets", Published as a conference paper at ICLR 2015, 2015, 13 pages.
Xu et al., "Training Shallow and Thin Networks for Acceleration via Knowledge Distillation With Conditional Adversarial Networks", Workshop Track—ICLR 2018, 2018, 4 pages.
Wang et al., "Improved Knowledge Distillation for Training Fast Low Resolution Face Recognition Model", Fujitsu Research & Development Center Co., Ltd., 2019, 7 pages.
International Search Report for PCT/KR2021/000891, mailed May 6, 2021, 2 pages.
Written Opinion of the ISA for PCT/KR2021/000891, mailed May 6, 2021, 7 pages.

* cited by examiner

FIG. 3

| Teacher Configuration | Student Configuration |
|---|---|
| Input (32 × 32 RGB image) | Input (32 × 32 RGB image) |
| Conv 3 × 3 – 64 ⟵ Guide Loss ⟶ | Conv 1 × 3 – 64 |
| BatchNorm ||
| Conv 3 × 3 – 64 | Conv 1 × 3 – 64 |
| BatchNorm, MaxPool ||
| Conv 3 × 3 – 128 ⟵ Guide Loss ⟶ | Conv 1 × 3 – 128 |
| BatchNorm ||
| Conv 3 × 3 – 128 | Conv 1 × 3 – 128 |
| BatchNorm, MaxPool ||
| Conv 3 × 3 – 256 ⟵ Guide Loss ⟶ | Conv 1 × 3 – 256 |
| BatchNorm ||
| Conv 3 × 3 – 256 | Conv 1 × 3 – 256 |
| BatchNorm, MaxPool ||
| Conv 3 × 3 – 512 ⟵ Guide Loss ⟶ | Conv 1 × 3 – 512 |
| BatchNorm ||
| Conv 3 × 3 – 512 | Conv 1 × 3 – 512 |
| BatchNorm, MaxPool ||
| FC layer 10 ||
| Teacher outputs ⟵ Guide Loss ⟶ | Student outputs |
| Targets ||

FIG. 9

| Loss composition | CIFAR - 10 | CIFAR - 100 |
|---|---|---|
| Baseline | 80.31 | 54.41 |
| $L_{HT}$ (T=10) | 84.39 | 61.95 |
| $L_{HT}+L_{L2}$ | 84.54 | 62.26 |
| $L_{HT}+L_{Gen}$ | 84.6 | 62.41 |
| $L_{HT}+L_{L2}+L_{Gen}$ (ours) | 84.76 | 62.55 |

ELECTRONIC DEVICE AND CONTROL METHOD THEREOF

CROSS-REFERENCE TO RELATED APPLICATIONS

This application is a continuation of International Application No. PCT/KR2021/000891 designating the United States filed on Jan. 22, 2021, in the Korean Intellectual Property Receiving Office and claiming priority to Korean Patent Application No. 10-2020-0029849 filed on Mar. 10, 2020, in the Korean Intellectual Property Office and Korean Patent Application No. 10-2020-0114122 filed on Sep. 7, 2020, in the Korean Intellectual Property Office, the disclosures of which are incorporated by reference herein in their entireties.

BACKGROUND

Field

The disclosure relates to an electronic device and a method for controlling the same, and for example, to an electronic device which trains an artificial intelligence model and a method for controlling the same.

Description of Related Art

An artificial intelligence model which realizes human-level intelligence is used in various fields. An artificial intelligence model may be a model with which a machine trains, determines, and becomes smart by itself, unlike a rule-based model of the related art, and the rule-based model of the related art is being replaced with a deep learning-based artificial intelligence model.

In general, as the capacity of the artificial intelligence model increases, the performance thereof is improved. However, according to miniaturization of an electronic device, it is necessary to reduce the capacity thereof while maintaining the performance of the artificial intelligence model. Various methods for this are being developed and the knowledge distillation of these methods uses a method for transferring a knowledge of a network having a large capacity (teacher network) to a network having a small capacity (student network) to be used in practice.

Referring to FIG. 1A, the knowledge distillation is a method for retraining the network having a small capacity (student network) so that an output of the network having a small capacity (student network) is similar to an output of the network having a large capacity (teacher network).

However, in this method, only last softmax information of each network is used, and accordingly, there is a problem that only a high-level feature is highlighted, while a low-level feature is not highlighted. In other words, in the application in which feature extraction of an object is important, it is difficult to apply the corresponding method.

Referring to FIG. 1B, a method for comparing outputs of layers may be provided, but because sizes of the outputs of the layers are different from each other, it is necessary to change the size of any one thereof. In this case, it is necessary to perform additional process in a training process, and if the number of layers is different or the number of channels included in the layer is different, the low-level feature may not be accurately reflected.

Therefore, it is necessary to develop a training method with improved performance while more accurately reflecting the low-level feature.

SUMMARY

Embodiments of the disclosure provide an electronic device for improving performance while compressing an artificial intelligence model through knowledge distillation and a method for controlling the same.

In accordance with an example embodiment of the disclosure, there is provided an electronic device including: a memory storing information on a first artificial intelligence model trained through first learning data and information on a second artificial intelligence model trained through the first learning data, and a processor connected to the memory and configured to control the electronic device, wherein the processor is configured to: input second learning data to each of the first artificial intelligence model and the second artificial intelligence model, and retrain the second artificial intelligence model based on an output of each of a plurality of first layers included in the first artificial intelligence model and an output of each of a plurality of second layers included in the second artificial intelligence model, wherein each of the plurality of first layers includes a plurality of two-dimensional filters, and wherein each of the plurality of second layers includes a plurality of filters having a size reduced from each of the plurality of two-dimensional filters of the corresponding first layer.

A number of the plurality of first layers may be the same as a number of the plurality of second layers, and the processor may be configured to: obtain a plurality of comparison results by comparing the output of each of the plurality of first layers with the output of the corresponding second layer, and retrain the second artificial intelligence model based on the plurality of comparison results.

A number of the plurality of two-dimensional filters included in each of the plurality of first layers may be the same as a number of the plurality of filters included in the corresponding second layer, and a size of the output of each of the plurality of first layers may be the same as a size of the output of the corresponding second layer.

The memory may store information on a third artificial intelligence model which is trained to discriminate the output of each of the plurality of first layers from the output of each of the plurality of second layers, and the processor may be configured to: input the output of each of the plurality of second layers to each third artificial intelligence model, obtain a plurality of discrimination results for the outputs of the plurality of second layers output from the third artificial intelligence model, and retrain the second artificial intelligence model based on the plurality of comparison results and the plurality of discrimination results.

The processor is configured to: input the second learning data to each retrained second artificial intelligence model, and retrain the third artificial intelligence model to discriminate the output of each of the plurality of first layers from an output of each of a plurality of third layers included in the retrained second artificial intelligence model.

The processor may be configured to: retrain the second artificial intelligence model by weight-summing the plurality of comparison results and the plurality of discrimination results.

The processor may be configured to: retrain the second artificial intelligence model by applying a weight value of a comparison result corresponding to a final layer among the plurality of first layers to be equal to or greater than weight values of the plurality of comparison results corresponding to remaining layers.

Each of the plurality of filters may be in a form of 1×N or in a form of N×1, and the processor may be configured to:

read input data from the memory in a row unit or a column unit, and input the read input data to the retrained second artificial intelligence model to process the input data.

The first artificial intelligence model and the second artificial intelligence model may be implemented as, for example, a convolutional neural network (CNN).

The memory may further store information on an auxiliary artificial intelligence model trained through the first learning data, and the processor may be configured to: input the second learning data to the auxiliary artificial intelligence model, retrain the auxiliary artificial intelligence model based on the output of each of the plurality of first layers and an output of each of a plurality of auxiliary layers included in the auxiliary artificial intelligence model, input the second learning data to the retrained auxiliary artificial intelligence model, and retrain the second artificial intelligence model based on the output of each of the plurality of auxiliary layers included in the retrained auxiliary artificial intelligence model and the output of each of the plurality of second layers. Each of the plurality of auxiliary layers may include a plurality of filters having a size reduced from each of the plurality of two-dimensional filters of the corresponding first layer.

The memory may further store information on a first auxiliary artificial intelligence model trained through the first learning data and information on a second auxiliary artificial intelligence model trained through the first learning data, and the processor may be configured to: input the second learning data to the first auxiliary artificial intelligence model and the second auxiliary artificial intelligence model, retrain the first auxiliary artificial intelligence model based on the output of each of the plurality of first layers and an output of each of a plurality of first auxiliary layers included in the first auxiliary artificial intelligence model, retrain the second auxiliary artificial intelligence model based on the output of each of the plurality of first layers and an output of each of a plurality of second auxiliary layers included in the second auxiliary artificial intelligence model, input the second learning data to the retrained first auxiliary artificial intelligence model and the retrained second auxiliary artificial intelligence model, and retrain the second artificial intelligence model based on the output of each of the plurality of first auxiliary layers included in the retrained first auxiliary artificial intelligence model, the output of each of the plurality of second auxiliary layers included in the retrained second auxiliary artificial intelligence model, and the output of each of the plurality of second layers. Each of the plurality of first auxiliary layers may include a plurality of filters having a size reduced from each of the plurality of two-dimensional filters of the corresponding first layer, each of the plurality of second auxiliary layers may include a plurality of filters having a size reduced from each of the plurality of two-dimensional filters of the corresponding first layer, and each of the plurality of filters included in each of the plurality of first auxiliary layers may have a form different from the filter included in each of the corresponding second auxiliary layer.

In accordance with an example embodiment of the disclosure, there is provided a method for controlling an electronic device, the method including: inputting second learning data to each of a first artificial intelligence model trained through first learning data and a second artificial intelligence model trained through the first artificial intelligence model, and retraining the second artificial intelligence model based on an output of each of a plurality of first layers included in the first artificial intelligence model and an output of each of a plurality of second layers included in the second artificial intelligence model, wherein each of the plurality of first layers may include a plurality of two-dimensional filters, and each of the plurality of second layers may include a plurality of filters having a size reduced from each of the plurality of two-dimensional filters of the corresponding first layer.

A number of the plurality of first layers may be the same as a number of the plurality of second layers, and the retraining may include obtaining a plurality of comparison results by comparing the output of each of the plurality of first layers with the output of the corresponding second layer, and retraining the second artificial intelligence model based on the plurality of comparison results.

A number of the plurality of two-dimensional filters included in each of the plurality of first layers may be the same as a number of the plurality of filters included in the corresponding second layer, and a size of the output of each of the plurality of first layers may be the same as a size of the output of the corresponding second layer.

The retraining may include inputting the output of each of the plurality of second layers to each third artificial intelligence model, obtaining a plurality of discrimination results for the outputs of the plurality of second layers output from the third artificial intelligence model, and retraining the second artificial intelligence model based on the plurality of comparison results and the plurality of discrimination results, and the third artificial intelligence model may be an artificial intelligence model trained to discriminate the output of each of the plurality of first layers from the output of each of the plurality of second layers.

The method may further include inputting the second learning data to each retrained second artificial intelligence model, and retraining the third artificial intelligence model to discriminate the output of each of the plurality of first layers from an output of each of a plurality of third layers included in the retrained second artificial intelligence model.

The retraining may include retraining the second artificial intelligence model by weight-summing the plurality of comparison results and the plurality of discrimination results.

The retraining may include retraining the second artificial intelligence model by applying a weight value of a comparison result corresponding to a final layer among the plurality of first layers to be equal to or greater than weight values of the plurality of comparison results corresponding to remaining layers.

Each of the plurality of filters may be in a form of 1×N or in a form of N×1, and the method may further include reading input data from the memory in a row unit or a column unit, and inputting the read input data to the retrained second artificial intelligence model to process the input data.

The first artificial intelligence model and the second artificial intelligence model may be implemented as, for example, a convolutional neural network (CNN).

In accordance with an example embodiment of the disclosure, there is provided a non-transitory computer-readable recording medium storing a program for executing a method for operating an electronic device, the method including: inputting second learning data to each of a first artificial intelligence model trained through first learning data and a second artificial intelligence model trained through the first artificial intelligence model, and retraining the second artificial intelligence model based on an output of each of a plurality of first layers included in the first artificial intelligence model and an output of each of a plurality of second layers included in the second artificial intelligence model, wherein each of the plurality of first layers may include a plurality of two-dimensional filters, and each of the plurality of second layers may include a plurality of filters having a size reduced from each of the plurality of two-dimensional filters of the corresponding first layer.

According to various example embodiments of the disclosure, the electronic device may compare outputs of respective layers of a teacher network and a student network to retrain the student network, thereby obtaining an artificial intelligence model in which a low-level feature is highlighted.

In addition, the electronic device may obtain an artificial intelligence model in which the low-level feature is further highlighted by further using a discriminator trained to discriminate outputs of the respective layers of the teacher network and the student network.

Further, the electronic device may use the student network having a size reduced from the size of the filter in a two-dimensional form of the teacher network, thereby reducing capacity of the artificial intelligence model and processing the input data by the on-the-fly method.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram comparing a first artificial intelligence model with a second artificial intelligence model according to various embodiments;

FIG. 9 is a diagram illustrating the performance of the retrained second artificial intelligence model according to various embodiments;

DETAILED DESCRIPTION

Hereinafter, the disclosure will be described in greater detail with reference to the accompanying drawings.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items.

The expressions "first," "second" and the like used in the disclosure may denote various elements, regardless of order and/or importance, and may be used to distinguish one element from another, and does not limit the elements.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

In this disclosure, a term "user" may refer to a person using an electronic device or a device using an electronic device (e.g., an artificial intelligence electronic device).

Hereinafter, various example embodiments of the disclosure will be described in greater detail with reference to the accompanying drawings.

Figure 1A:
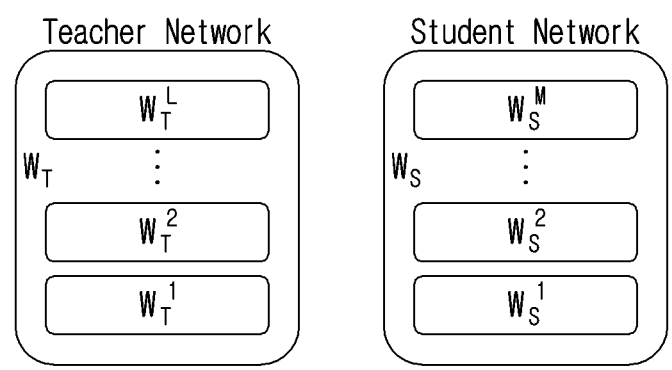
FIGS. 1A and 1B are diagrams illustrating example problems according to a technology of the related art.
Figure 1B:
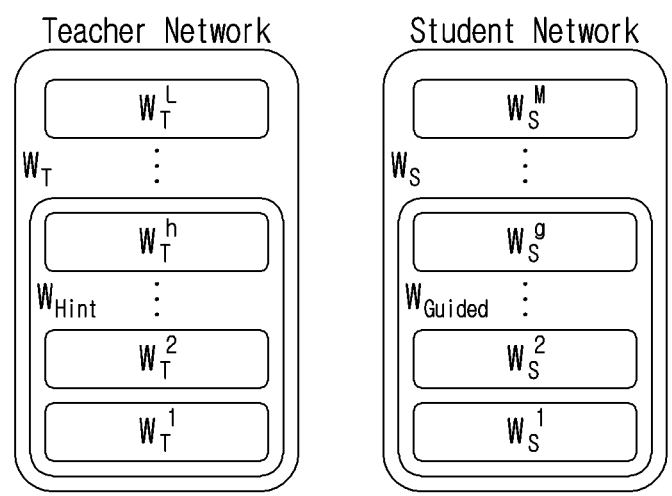
Figure 2:
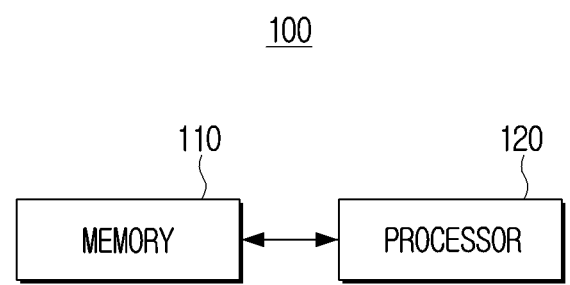
FIG. 2 is a block diagram illustrating an example configuration of an electronic device according to various embodiments.

FIG. 2 is a block diagram illustrating an example configuration of an electronic device 100 according to various embodiments.

The electronic device 100 may be a device which trains an artificial intelligence model, and may be a device such as, for example, and without limitation, a TV, a desktop PC, a laptop, a video wall, a large format display (LFD), a digital signage, a digital information display (DID), a projector display, a digital video disk (DVD) player, a smartphone, a table PC, a monitor, smart glasses, a smart watch, a set-top box (STB), a speaker, a main computer, or the like. However, there is no limitation thereto, and the electronic device 100 may be any device, as long as it is able to train an artificial intelligence model.

Referring to FIG. 2, the electronic device 100 may include a memory 110 and a processor (e.g., including processing circuitry) 120. However, there is no limitation thereto, and the electronic device 100 may be implemented without including some elements.

The memory 110 may store a first artificial intelligence model and a second artificial intelligence model. For example, the first artificial intelligence model and the second artificial intelligence model may be implemented in a form of, for example, a convolutional neural network (CNN).

The first artificial intelligence model may be trained through first learning data and may be a network having a large capacity (teacher network). The second artificial intelligence model may be trained through the first learning data and may be a network having a small capacity (student network). In other words, the first artificial intelligence model and the second artificial intelligence model may be trained using the same first learning data.

The second artificial intelligence model may be an artificial intelligence model having a size of a filter reduced from that of the first artificial intelligence model. For example, a number of a plurality of first layers included in the first artificial intelligence model may be the same as a number of a plurality of second layers included in the second artificial intelligence model. Each of the plurality of first layers may include a plurality of two-dimensional filters, and each of the plurality of second layers may include a plurality of filters having a size reduced from that of the plurality of two-dimensional filters of the corresponding first layer. Herein, the number of plurality of two-dimensional filters included in each of the plurality of first layers may be the same as the number of plurality of filters included in the corresponding second layer.

If all filters included in the first artificial intelligence model are in a form of N×N and all filters included in the second artificial intelligence model are in a form of n×N (herein, n<N), the second artificial intelligence model may be implemented with a capacity of n/N of a capacity of the first artificial intelligence model. However, since the second artificial intelligence model is implemented with a relatively small capacity and trained by the same training method, the output of the second artificial intelligence model may show deteriorated quality than the output of the first artificial intelligence model. The second artificial intelligence model may be retrained so that the output of the second artificial intelligence model becomes similar to the output of the first artificial intelligence model, and this will be described in the part of the operation of the processor 120.

While it is described that the memory 110 stores the first artificial intelligence model and the second artificial intelligence model trained through the first learning data, but there is no limitation thereto. For example, the memory 110 may store only the first learning data, the first artificial intelligence model, a weight value of which is not determined, and the second artificial intelligence model, a weight value of which is not determined. The first artificial intelligence model, the weight value of which is not determined, may be a model before being trained which has all weight values of 0, while having the same form as the first artificial intelligence model. The second artificial intelligence model, the weight value of which is not determined, may be a model before being trained which has all weight values of 0, while having the same form as the second artificial intelligence model. In this case, the processor 120 may train the first artificial intelligence model, the weight value of which is not determined, and the second artificial intelligence model, the weight value of which is not determined, using the first learning data to obtain the first artificial intelligence model and the second artificial intelligence model, and store the obtained first artificial intelligence model and second artificial intelligence model in the memory 110.

The memory 110 may further store information on a third artificial intelligence model trained to discriminate the output of each of the plurality of first layers from the output of each of the plurality of second layers. The third artificial intelligence model is a type of a discriminator, and may be a model which is trained to, when data is input, identify whether the corresponding data is an output of the first artificial intelligence model or an output of the second artificial intelligence model.

However, there is no limitation thereto, and the memory 110 may store the third artificial intelligence model, a weight value of which is not determined. The third artificial intelligence model, the weight value of which is not determined, may be a model before being trained which has all weight values of 0, while having the same form as the third artificial intelligence model. In this case, the processor 120 may train the third artificial intelligence model, the weight value of which is not determined, to discriminate the output of each of the plurality of first layers from the output of each of the plurality of second layers and store the trained third artificial intelligence model in the memory 110.

The memory 110 may further store second learning data. The second learning data may be data used when retraining the second artificial intelligence model.

The memory 110 may further store input data. The input data may be a target to be processed through the retrained second artificial intelligence model.

The processor 120 may include various processing circuitry and generally control the operations of the electronic device 100. For example, the processor 120 may be connected to each element of the electronic device 100 to generally control the operations of the electronic device 100. For example, the processor 120 may be connected to elements such as the memory 110, a communication interface (not illustrated), and the like to control the operations of the electronic device 100.

According to an embodiment, the processor 120 may be implemented, for example, and without limitation, as a digital signal processor (DSP), a central processing unit (CPU), a microprocessor, a time controller (TCON), or the like. However, there is no limitation thereto, and the processor may include, for example, and without limitation, one or more of a central processing unit (CPU), a microcontroller unit (MCU), a microprocessing unit (MPU), a controller, an application processor (AP), a communication processor (CP), an ARM processor, or the like, or may be defined as the corresponding term. In addition, the processor 120 may be implemented as System on Chip (SoC) or large scale integration (LSI) including the processing algorithm or may be implemented in a form of a field programmable gate array (FPGA).

The processor 120 may input the second learning data to each of the first artificial intelligence model and the second artificial intelligence model and retrain the second artificial intelligence model based on the output of each of the plurality of first layers included in the first artificial intelligence model and the output of each of the plurality of second layers included in the second artificial intelligence model. The output of each of the plurality of first layers included in the first artificial intelligence model and the output of each of the plurality of second layers included in the second artificial intelligence model may include feature map data and final output data. In other words, the output of each of the plurality of first layers included in the first artificial intelligence model and the output of each of the plurality of second layers included in the second artificial intelligence model may include a convolution layer output (feature map) and a fully connected (FC) layer output (Logits).

The processor 120 may compare the output of each of the plurality of first layers with the output of the corresponding second layer to obtain a plurality of comparison results, and retrain the second artificial intelligence model based on the plurality of comparison results. For example, the processor 120 may retrain the second artificial intelligence model so as to reduce a norm value using the Euclidean distance between the output of each of the plurality of first layers and the output of the corresponding second layer. Through such training, the output of each of the plurality of second layers may become similar to the corresponding output of the corresponding first layer.

A size of the output of each of the plurality of first layers may be the same as a size of the output of the corresponding second layer. This is because the second artificial intelligence model is an artificial intelligence model obtained by reducing only the size of the filter from that of the first artificial intelligence model.

The processor 120 may input the output of each of the plurality of second layers to each of the third artificial intelligence model, obtain a plurality of discrimination results for the outputs of the plurality of second layers output from the third artificial intelligence model, and retrain the second artificial intelligence model based on the plurality of comparison results and the plurality of discrimination results. In other words, the processor 120 may retrain the second artificial intelligence model so that the output of each of the plurality of second layers is identified as the output of the first artificial intelligence model by the third artificial intelligence model.

The processor 120 may retrain the second artificial intelligence model by, for example, weight-summing of the plurality of comparison results and the plurality of discrimination results. For example, the processor 120 may retrain the second artificial intelligence model by applying a weight value of the comparison result corresponding to a final layer among the plurality of first layers to be equal to or greater than weight values of the plurality of comparison results corresponding to remaining layers.

However, there is no limitation thereto, and the processor 120 may apply the weight value by various methods.

By retraining the second artificial intelligence model by the method described above, the output of the second artificial intelligence model may become more similar to the output of the first artificial intelligence model.

The processor 120 may input the second learning data to each retrained second artificial intelligence model, and retrain the third artificial intelligence model to discriminate the output of each of the plurality of first layers from an output of each of a plurality of third layers included in the retrained second artificial intelligence model.

The processor 120 may input third learning data to each of the first artificial intelligence model and the retrained second artificial intelligence model, and secondarily retrain the retrained second artificial intelligence model based on the output of each of the plurality of first layers included in the first artificial intelligence model and the output of each of the plurality of third layers included in the retrained second artificial intelligence model. The processor 120 may compare the output of each of the plurality of first layers with the output of the corresponding third layer to obtain a plurality of comparison results, and secondarily retrain the retrained second artificial intelligence model based on the plurality of comparison results.

The processor 120 may input the output of each of the plurality of third layers to each retrained third artificial intelligence model, obtain a plurality of discrimination results for the output of the plurality of third layers output from the retrained third artificial intelligence model, and secondarily retrain the retrained second artificial intelligence model based on the plurality of comparison results and the plurality of discrimination results.

In other words, the processor 120 may repeatedly retrain the second artificial intelligence model and the third artificial intelligence model to improve performance of the second artificial intelligence model.

The plurality of filters included in each of the plurality of second layers may have a size reduced from that of each of the plurality of two-dimensional filters of the corresponding first layer. For example, if the size of each of the plurality of two-dimensional filters is in a form of N×N, the plurality of filters may be in a form of n×N or in a form of N×n. Herein, n is less than N.

For example, the plurality of filters included in each of the plurality of second layers may have a one-dimensional form with a size reduced form that of each of the plurality of two-dimensional filters of the corresponding first layer. In this case, each of the plurality of one-dimensional filters may be in a form of 1×N or in a form of N×1, and the processor 120 may read input data from the memory 110 in a row unit or a column unit, and input the read input data to the retrained second artificial intelligence model to process the input data.

In other words, with the feature of the form of the filters, the input data may be processed by the on-the-fly method, in a case of using the retrained second artificial intelligence model.

While it is described that the first artificial intelligence model is compressed to obtain the second artificial intelligence model, such a method may be performed in stepwise manner or in parallel.

For example, the memory 110 may further store information on an auxiliary artificial intelligence model trained through the first learning data. The processor 120 may input the second learning data to the auxiliary artificial intelligence model, retrain the auxiliary artificial intelligence model based on the output of each of the plurality of first layers and an output of each of a plurality of auxiliary layers included in the auxiliary artificial intelligence model, input the second learning data to the retrained auxiliary artificial intelligence model, retrain the second artificial intelligence model based on the output of each of the plurality of auxiliary layers included in the retrained auxiliary artificial intelligence model and the output of each of the plurality of second layers. Herein, each of the plurality of auxiliary layers may include a plurality of filters having a size reduced from that of each of the plurality of two-dimensional filters of the corresponding first layer.

In other words, the auxiliary artificial intelligence model also have substantially the same form as the first artificial intelligence model and the second artificial intelligence model. However, the auxiliary artificial intelligence model may have the filter having a size reduced from that of the first artificial intelligence model. In addition, in order to exhibit the advantages of the stepwise retraining, the auxiliary artificial intelligence model may have a size greater than that of the filter of the second artificial intelligence model.

The memory 110 may further store information on a first auxiliary artificial intelligence model trained through the first learning data and information on a second auxiliary artificial intelligence model trained through the first learning data. The processor 120 may input the second learning data to the first auxiliary artificial intelligence model and the second auxiliary artificial intelligence model, retrain the first auxiliary artificial intelligence model based on the output of each of the plurality of first layers and an output of each of a plurality of first auxiliary layers included in the first auxiliary artificial intelligence model, retrain the second auxiliary artificial intelligence model based on the output of each of the plurality of first layers and an output of each of a plurality of second auxiliary layers included in the second auxiliary artificial intelligence model, input the second learning data to the retrained first auxiliary artificial intelligence model and the retrained second auxiliary artificial intelligence model, and retrain the second artificial intelligence model based on the output of each of the plurality of first auxiliary layers included in the retrained first auxiliary artificial intelligence model, the output of each of the plurality of second auxiliary layers included in the retrained second auxiliary artificial intelligence model, and the output of each of the plurality of second layers. Herein, each of the plurality of first auxiliary layers may include a plurality of filters having a size reduced from that of each of the plurality of two-dimensional filters of the corresponding first layer, each of the plurality of second auxiliary layers may include a plurality of filters having a size reduced from that of each of the plurality of two-dimensional filters of the corresponding first layer, and each of the plurality of filters included in each of the plurality of first auxiliary layers may have a form different from that of the filter included in each of the corresponding second auxiliary layer.

For example, the processor 120 may weight-sum the output of each of the plurality of first auxiliary layers included in the retrained first auxiliary artificial intelligence model and the output of each of the plurality of second auxiliary layers included in the retrained second auxiliary artificial intelligence model, and retrain the second artificial intelligence model based on the weight-summed result and the output of each of the plurality of second layers.

In other words, the processor 120 may retrain two auxiliary artificial intelligence models in parallel and retrain the second artificial intelligence model based on the two retrained auxiliary artificial intelligence models.

The function related to the artificial intelligence according to the disclosure may be operated through the processor 120 and the memory 110.

The processor 120 may be formed of one or a plurality of processors. The one or the plurality of processors may include, for example, and without limitation, a general-purpose processor such as a CPU, an AP, or a DSP, a graphic dedicated processor such as a GPU or a vision processing unit (VPU), an artificial intelligence dedicated processor such as an NPU, or the like.

The one or the plurality of processors may perform control to process the input data according to a predefined action rule stored in the memory 110 or an artificial intelligence model. In addition, if the one or the plurality of processors are artificial intelligence dedicated processors, the artificial intelligence dedicated processor may be designed to have a hardware structure specialized in processing of a specific artificial intelligence model. The predefined action rule or the artificial intelligence model is formed through training.

Being formed through training herein may, for example, refer to a predefined action rule or an artificial intelligence model set to perform a desired feature (or objects) being formed by training a basic artificial intelligence model using a plurality of pieces of learning data by a learning algorithm. Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weight values. The plurality of weight values of the plurality of neural network layers may be optimized by the training result of the artificial intelligence model. For example, the plurality of weight values may be updated to reduce or to minimize a loss value or a cost value obtained by the artificial intelligence model during the training process.

The artificial neural network may include a deep neural network (DNN), and, for example, and without limitation, include a convolutional neural network (CNN), deep neural network (DNN), a recurrent neural network (RNN), a restricted Boltzmann machine (RBM), a deep belief network (DBN), a bidirectional recurrent deep neural network (BRDNN), deep Q-network, or the like, but there is no limitation to these examples.

The electronic device 100 may further include a communication interface.

The communication interface may be an element which communicates with various types of external device according to various types of communication method. The communication interface may include various module, each including communication circuitry, such as, for example, and without limitation, a Wi-Fi module, a Bluetooth module, an infrared communication module, a wireless communication module, and the like. Each communication module may be implemented as at least one hardware chip.

The processor 120 may communicate with various external devices using the communication interface. For example, the processor 120 may receive the first learning data, the second learning data, the first artificial intelligence model, the second artificial intelligence model, and the third artificial intelligence model from a first external device via the communication interface, and store the received data in the memory 110. The processor 120 may control the communication interface to transmit the retrained second artificial intelligence model to a second external device. The external device may include a server, Bluetooth earphones, a display device, and the like.

The Wi-Fi module and the Bluetooth module may perform the communication by a Wi-Fi method and a Bluetooth method, respectively. In a case of using the Wi-Fi module or the Bluetooth module, various pieces of connection information such as SSID or session key may be transmitted or received first to allow the communication connection using these, and then various pieces of information may be transmitted and received.

The infrared communication module may perform communication according to a technology of infrared communication (infrared Data Association (IrDA)) for transmitting data in a close range wirelessly using infrared rays between visible rays and millimeter waves.

The wireless communication module may include at least one communication chip for performing communication according to various wireless communication standard such as zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the above communication method.

In addition, the communication interface may include at least one of wired communication modules for performing communication using a local area network (LAN) module, an Ethernet module, pair cables, a coaxial cable, or an optical fiber cable.

The communication interface may further include an input and output interface. The input and output interface may be any one interface of a high definition multimedia interface (HDMI), a mobile high-definition link (MHL), a universal serial bus (USB), a display port (DP), Thunderbolt, a video graphics array (VGA) port, a RGB port, a D-subminiature (D-SUB), and a digital visual interface (DVI).

The input and output interface may include various circuitry and input and output at least one of audio or video signals.

According to an implementation example, the input and output interface may include a port which inputs and outputs only an audio signal and a port which inputs and outputs only a video signal as separate ports, or may be implemented as one port which inputs and outputs both the audio signal and the video signal.

According to various embodiments of the disclosure described above, along with the retraining of the second artificial intelligence model, the weight of the first artificial intelligence model may be reduced while further improving the performance, and the input data may be processed by the on-the-fly method by the features of the form of the filter included in the second artificial intelligence model.

Hereinafter, various operations of the processor 120 will be described in greater detail with reference to various drawings.

FIG. 3 is a diagram illustrating an example of comparing the first artificial intelligence model with the second artificial intelligence model according to various embodiments.

The first artificial intelligence model (e.g., teacher configuration) has substantially the same form as that of the second artificial intelligence model (e.g., student configuration). However, the second artificial intelligence model may be an artificial intelligence model including a filter having a size reduced from that of the filter of the first artificial intelligence model. For example, referring to FIG. 3, the number of the plurality of first layers included in the first artificial intelligence model and the number of the plurality of second layers included in the second artificial intelligence model may be respectively five in total in the same manner. In addition, a number of channels of the corresponding layer, that is, a number of filters included in the corresponding layer may be the same. A first layer of the first artificial intelligence model and a first layer of the second artificial intelligence model may include 64 channels in total.

Each of the plurality of first layers may include a plurality of two-dimensional filters, and each of the plurality of second layers may include a plurality of filters having a size reduced from the size of each of the plurality of two-dimensional filters of the corresponding first layer. For convenience of description, FIG. 3 illustrates that each of the plurality of first layers includes a plurality of filters in a form of 3×3, and each of the plurality of second layers include a plurality of filters in a form of 1×3. Accordingly, the second artificial intelligence model may be implemented with ⅓ of capacity, compared to the first artificial intelligence model.

In addition, since the number of the plurality of first layers included in the first artificial intelligence model is the same as the number of the plurality of second layers included in the second artificial intelligence model, the feature maps may be compared one on one.

Although there is a difference in a form of filters, the convolution processing result may be output in the same form. In other words, the size of the output of each of the plurality of first layers may be the same as the size of the output of the corresponding second layer, the corresponding outputs may be directly compared accordingly, and it is not necessary to separately perform an operation such as a change of size.

Figure 4:
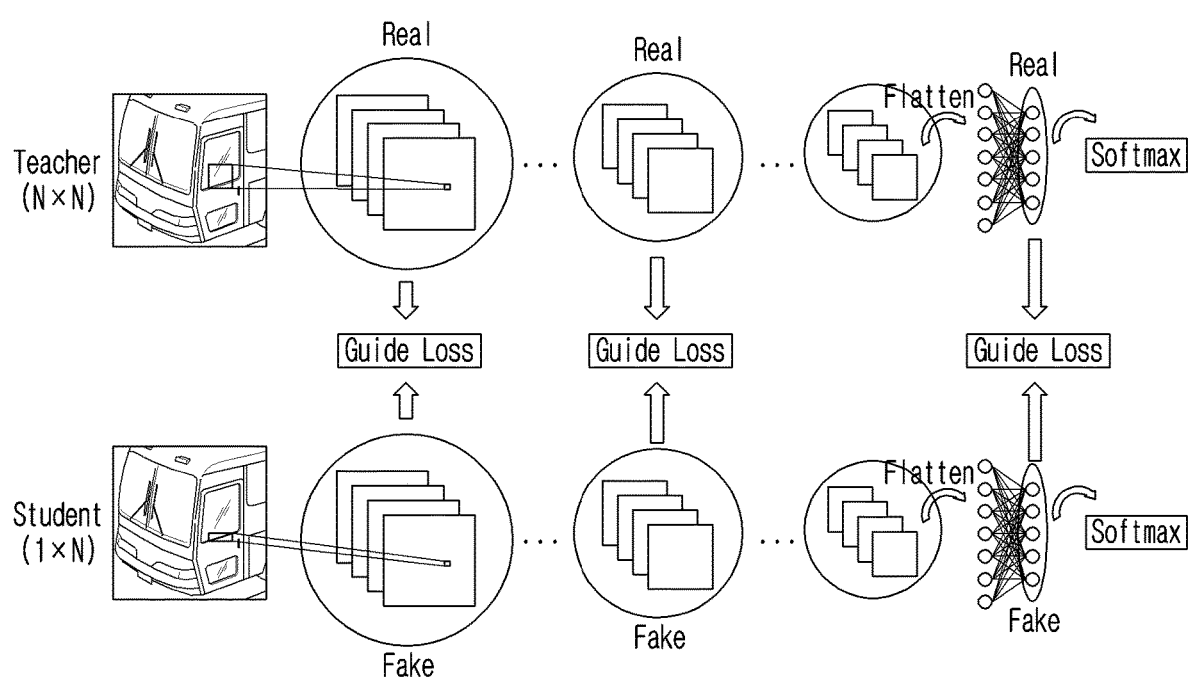
FIG. 4 is a diagram for comparing outputs of layers between the first artificial intelligence model and the second artificial intelligence model according to various embodiments.

FIG. 4 is a diagram illustrating an example of comparing outputs of layers between the first artificial intelligence model and the second artificial intelligence model according to various embodiments.

The processor 120 may compare the output of each of the plurality of first layers included in the first artificial intelligence model with the output of the corresponding second layer included in the second artificial intelligence model to obtain a plurality of comparison results, and input the output of each of the plurality of second layers to each third artificial intelligence model to obtain a plurality of discrimination results for the output of the plurality of second layers output from the third artificial intelligence model.

In other words, the processor 120 may compare the output of a first layer among the plurality of first layers with the output of a first layer among the plurality of second layers to obtain a comparison result between the first layers, and obtain a discrimination result of the third artificial intelligence model for the output of the first layer among the plurality of second layers. In FIG. 4, a comparison result (L2 loss, Softmax) and a discrimination result (Discriminator loss) in each layer are indicated as Guide Loss, and the processor 120 may obtain the same guide loss for first and subsequent layers.

The processor 120 may reflect the guide loss of each layer and retrain the second artificial intelligence model, thereby further highlighting the low-level feature. In other words, according to the disclosure, an intermediate result of the network may be guided to improve the performance of the second artificial intelligence model, compared to the technology of the related art of comparing with only the final softmax information.

Figure 5:
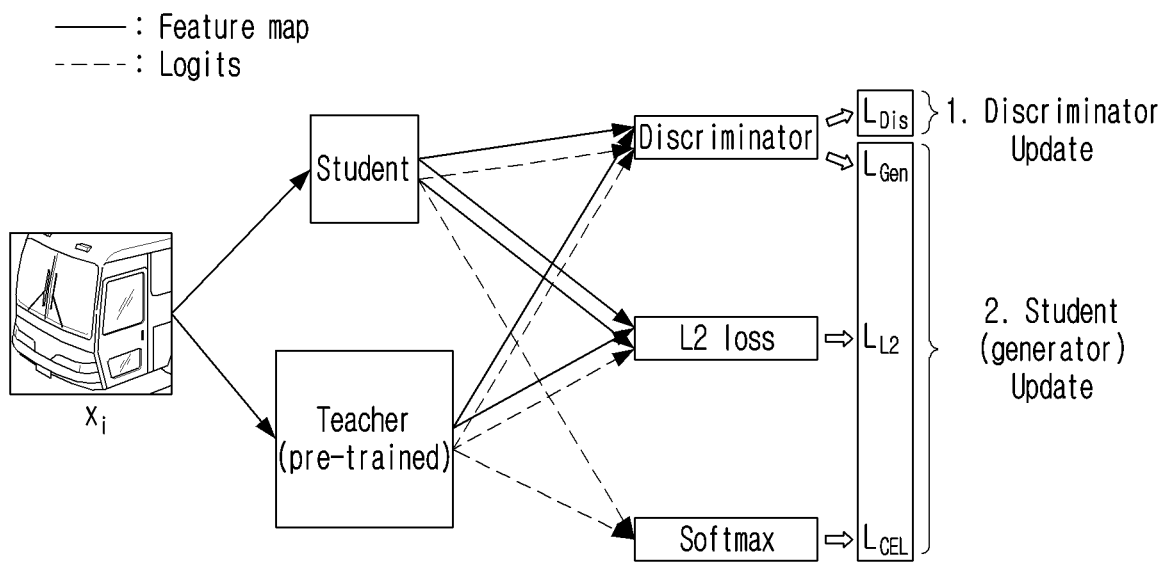
FIG. 5 is a diagram illustrating an example retraining step of the second artificial intelligence model according to various embodiments.

FIG. 5 is a diagram illustrating an example retraining step of the second artificial intelligence model according to various embodiments.

The first artificial intelligence model (teacher) and the second artificial intelligence model (student) may be in a state of being primarily trained through the first learning data. The third artificial intelligence model (discriminator) may be in a state of being trained to discriminate feature map data of the first artificial intelligence model from feature map data of the second artificial intelligence model.

The processor 120 may input second learning data Xi to each of the first artificial intelligence model and the second artificial intelligence model, and compare the output of each of the plurality of first layers with the output of the corresponding second layer to obtain a plurality of comparison results L2 loss (softmax).

The processor 120 may input the output of each of the plurality of second layers to each third artificial intelligence model to obtain a plurality of discrimination results (discriminator loss) for the outputs of the plurality of second layers.

The processor 120 may retrain the second artificial intelligence model based on the plurality of comparison results and the plurality of discrimination results.

The processor 120 may input the second learning data to each retrained second artificial intelligence model, and retrain the third artificial intelligence model to discriminate the output of each of the plurality of first layers from the output of each of the plurality of third layers included in the retrained second artificial intelligence model.

By repeating the above processes, it is possible to improve the performance of the second artificial intelligence model and improve the discrimination performance of the third artificial intelligence model.

Figure 6A:
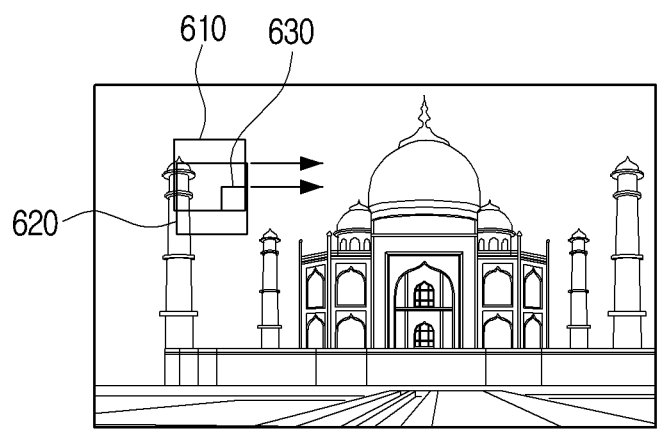
FIGS. 6A and 6B are diagrams illustrating an example on-the-fly method according to various embodiments.
Figure 6B:
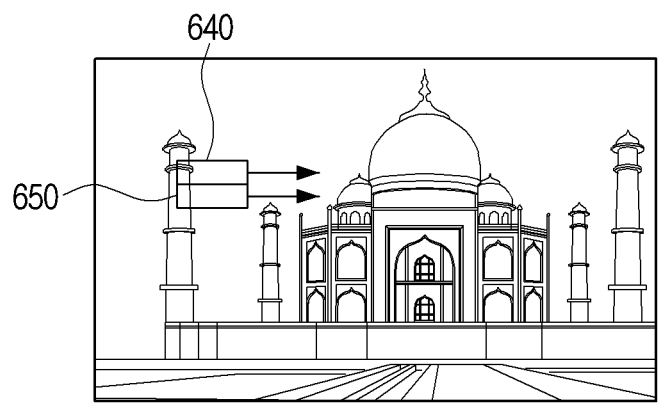

FIGS. 6A and 6B are diagrams illustrating an example on-the-fly method according to various embodiments.

FIG. 6A is a diagram illustrating an example of using a two-dimensional filter of the related art and a two-dimensional filter of 3×3 is assumed. The two-dimensional filter may be shifted to the right from a first region 610 of the input data and the convolution processing may be performed. In this case, the processor may read the first region 610 from the memory to perform the processing, and perform the processing of a region shifted to the right from the first region 610 by one box. In this case, the processor may read only the added region from the memory and remove a region not overlapped from the first region 610. After the row is changed by repeating these processes, the processor may read a second region 620. In other words, a part of the first region 610 may be read again from the memory. In this case, a third region 630 may be read three times in total.

In this regard, FIG. 6B is a diagram illustrating a case of using the one-dimensional filter, and the one-dimensional filter in a form of 1×3 is assumed. The one-dimensional filter may be shifted to the right from a fourth region 640 of the input data and the convolution processing may be performed. In this case, the processor may read the fourth region 640 from the memory 110 to perform the processing, and perform processing of a region shifted to the right from the fourth region 640 by one box. After the row is changed, the processor 120 may read a fifth region 650, but because there is no part overlapped with the fourth region 640, a problem of repeatedly reading the same region is solved, and it is possible to perform more advantageous operation by the on-the-fly method.

FIGS. 7A, 7B, 8A and 8B (which may be referred to hereinafter as "FIGS. 7A to 8B") are diagrams illustrating example performance of the retrained second artificial intelligence model according to various embodiments.

Figure 7A:
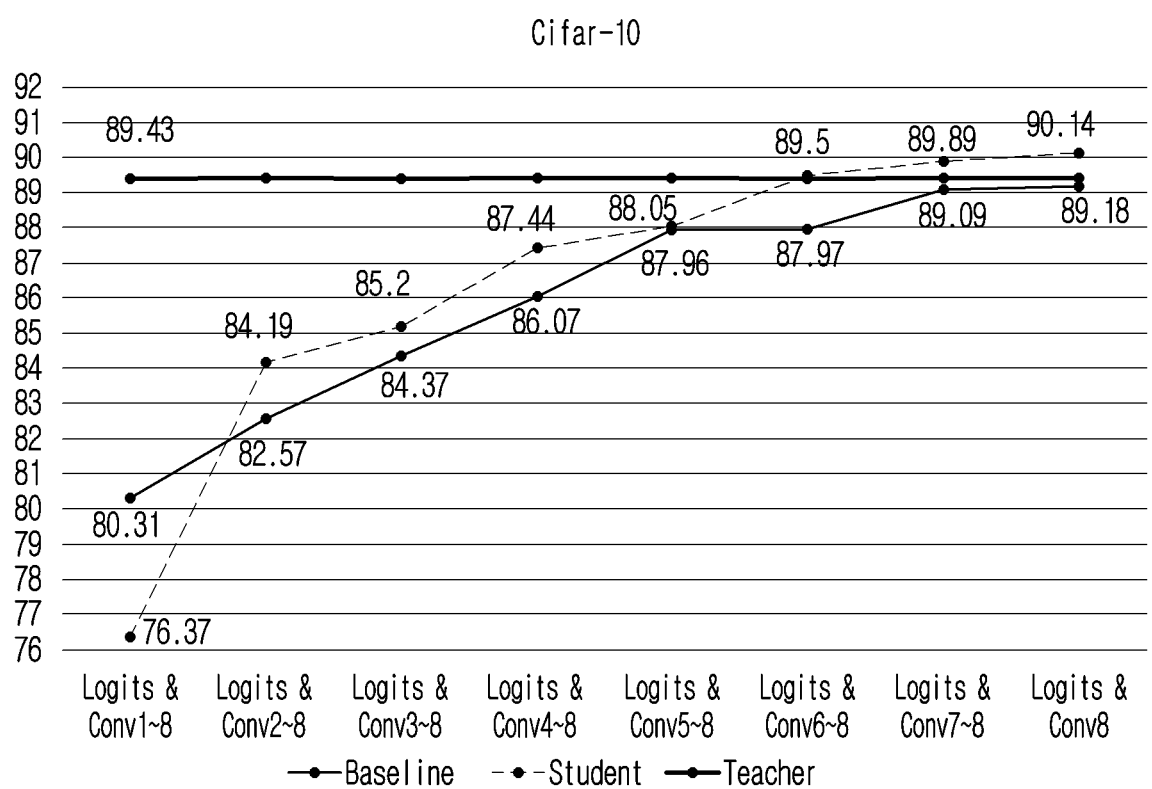
FIGS. 7A, 7B, 8A and 8B are diagrams illustrating example performance of the retrained second artificial intelligence model according to various embodiments.
Figure 7B:
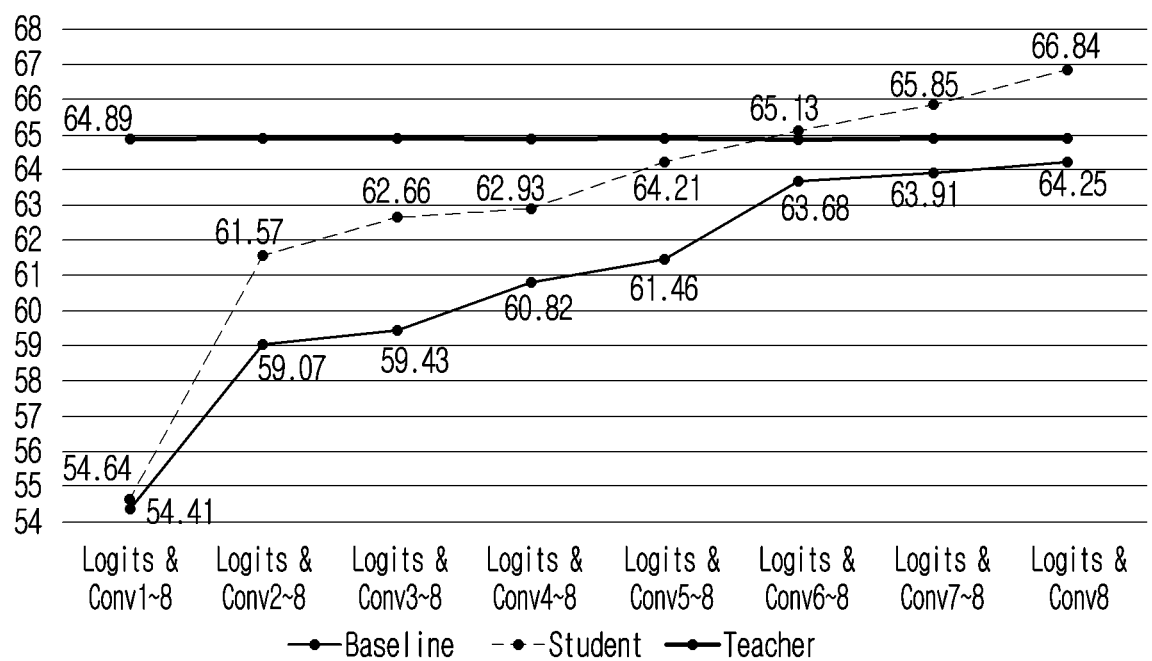
Figure 8A:
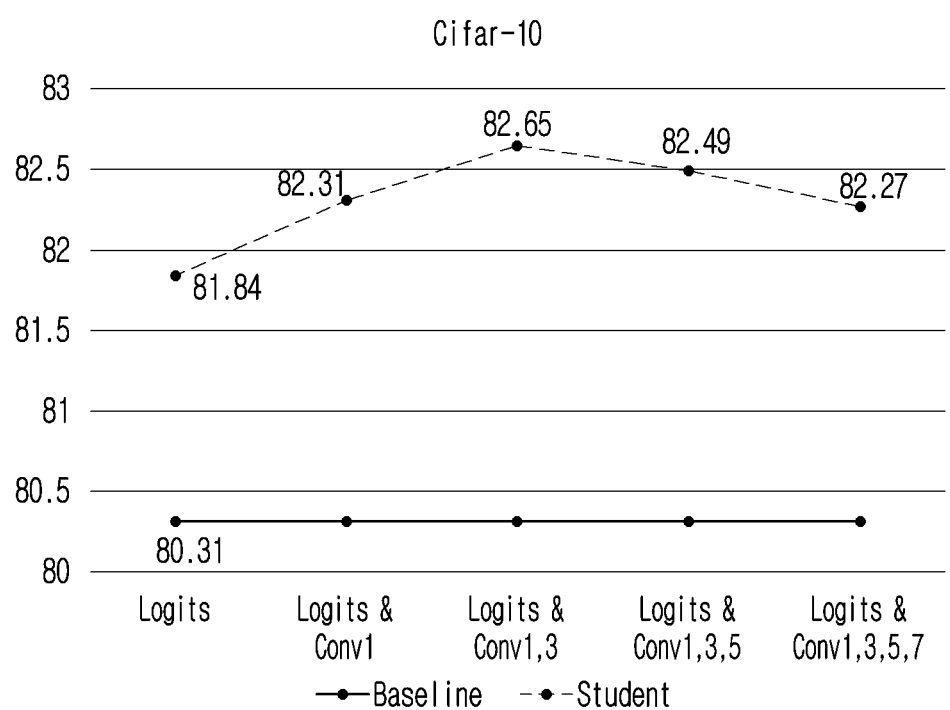
Figure 8B:
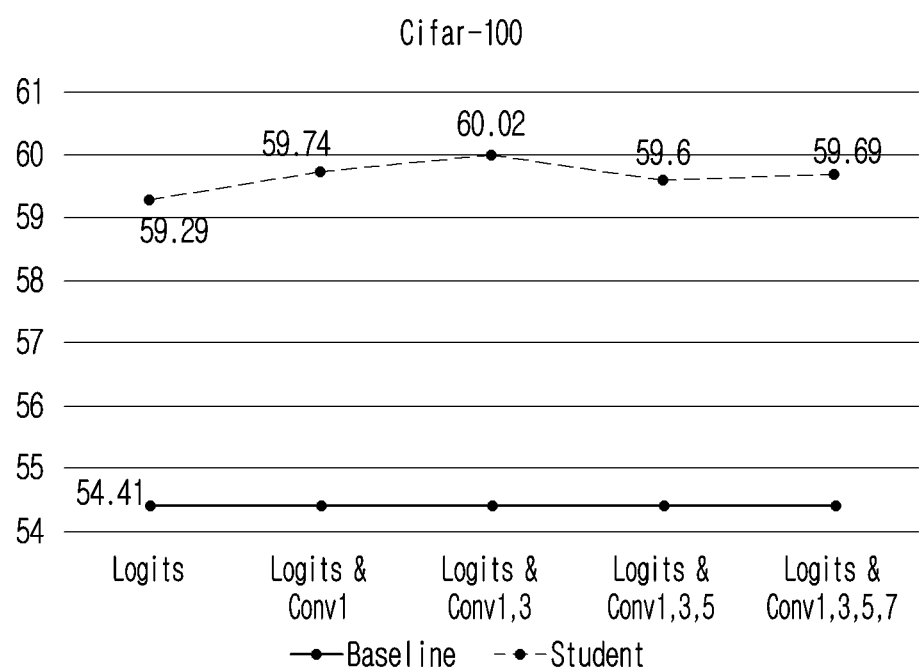

FIGS. 7A to 8B illustrate experimental results using the first artificial intelligence model and the second artificial intelligence model in the same form as in FIG. 3, and it is assumed that each of the first artificial intelligence model and the second artificial intelligence model includes eight convolution layers and one fully connected (FC) layer. In addition, it is assumed that each of the plurality of first layers of the first artificial intelligence model includes a plurality of filters in a form of 3×3. Referring to an x axis of FIGS. 7A and 7B, in the second artificial intelligence model, only some layers of the plurality of second layers are changed to filters in a form of 1×3. In FIGS. 8A and 8B, all layers of the second artificial intelligence model are changed to filters in a form of 1×3.

In FIGS. 7A to 8B, Teacher indicates performance of a classification accuracy of the first artificial intelligence model, Student indicates performance of a classification accuracy of the retrained second artificial intelligence model, and Baseline indicates performance of a classification accuracy of the model simply using only a form of 1×3.

FIGS. 7A and 7B show the performance of the classification accuracy of the retrained second artificial intelligence model in consideration of only the output of the convolution layer and the output of the FC layer, and Student shows the performance improved than the performance of Baseline.

However, the first convolution layer may play a very important role of extracting low-level feature such as an edge, a curve, or the like that is considered to be important in classification or object detection, and have a greatest input size. Accordingly, if the first convolution layer is changed to the filter in a form of 1×3, a rapid deterioration in performance may occur.

Such a problem can be addressed using the third artificial intelligence model. FIGS. 8A and 8B illustrate the performance of the classification accuracy of the retrained second artificial intelligence model in consideration of the output of the convolution layer, the output of the FC layer, and the discrimination result of the third artificial intelligence model. However, referring to an x axis of FIGS. 8A and 8B, the third artificial intelligence model is applied to only some layers. In this case, it is found that Student indicates the performance improved from that of Baseline.

FIG. 9 is a diagram illustrating an example of comparing the technology of the related art and the performance of the retrained second artificial intelligence model according to various embodiments.

Baseline indicates the performance of the model using only a form of 1×3, and $L_{HT}$ indicates the performance of the technology of the related art. $L_{HT}+L_{L2}$ indicates the performance in a case of using the comparison result of each layer between the technology of the related art and the disclosure, $L_{HT}+L_{Gen}$ indicates the performance in a case of using the discrimination result of each layer between the technology of the related art and the disclosure, $L_{HT}+L_{L2}+L_{Gen}$ indicates the performance in a case of using the comparison result and the discrimination result of each layer between the technology of the related art and the disclosure, and it is found that the performance in a case of using both the comparison result and the discrimination result is most improved.

Figure 10:
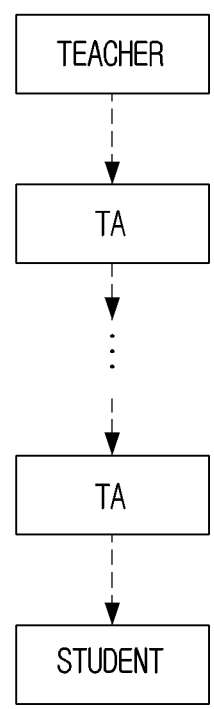
FIG. 10 is a diagram illustrating an example stepwise retraining method according to various embodiments.

FIG. 10 is a diagram illustrating an example stepwise retraining method according to various embodiments.

Referring to FIG. 10, the processor 120 may retrain the second artificial intelligence model finally using a plurality of auxiliary artificial intelligence models TA. Herein, a method for retraining the auxiliary artificial intelligence model is the same as the method for retraining the second artificial intelligence model described above, and therefore the overlapped description will not be repeated.

However, the filter included in the auxiliary artificial intelligence model may have a size reduced from that of the filter included in the first artificial intelligence model. On the other hand, the filter included in the auxiliary artificial intelligence model may have a size greater than that of the filter included in the second artificial intelligence model.

In other words, in a case of reducing the size of the filter of the first artificial intelligence model to that of the second artificial intelligence model at once, an important factor may be lost, but in a case of reducing the size of the first artificial intelligence model in a stepwise manner using at least one auxiliary artificial intelligence model, the important factor may be preserved. In other words, the second artificial intelligence model retrained in a stepwise manner may have features of the first artificial intelligence model more than the second artificial intelligence model retrained without using the auxiliary artificial intelligence model.

Figure 11A:
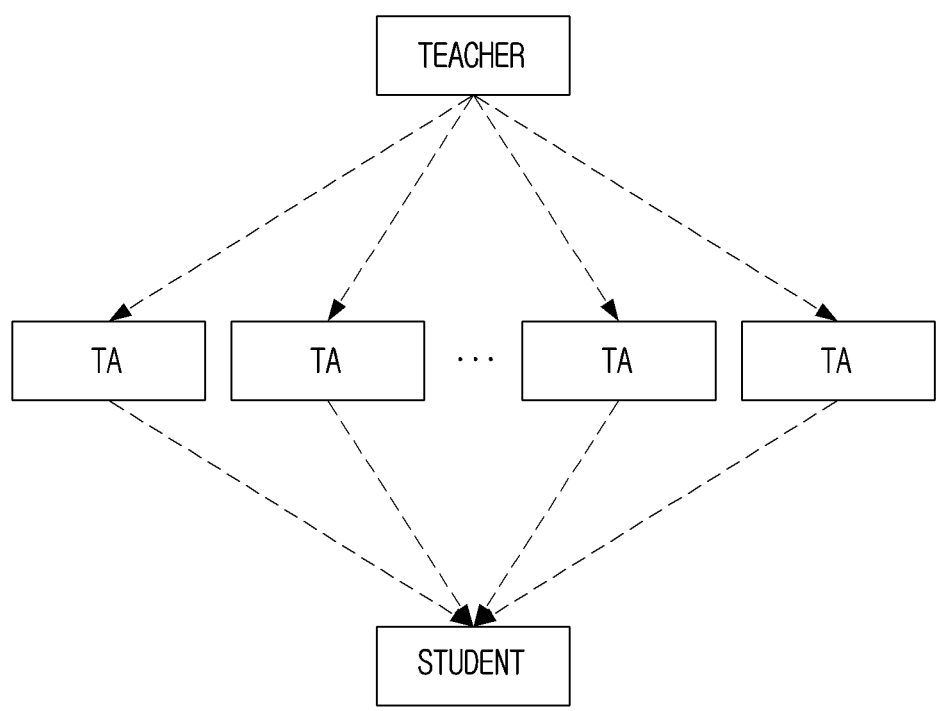
FIGS. 11A and 11B are diagrams illustrating an example parallel retraining method according to various embodiments.
Figure 11B:
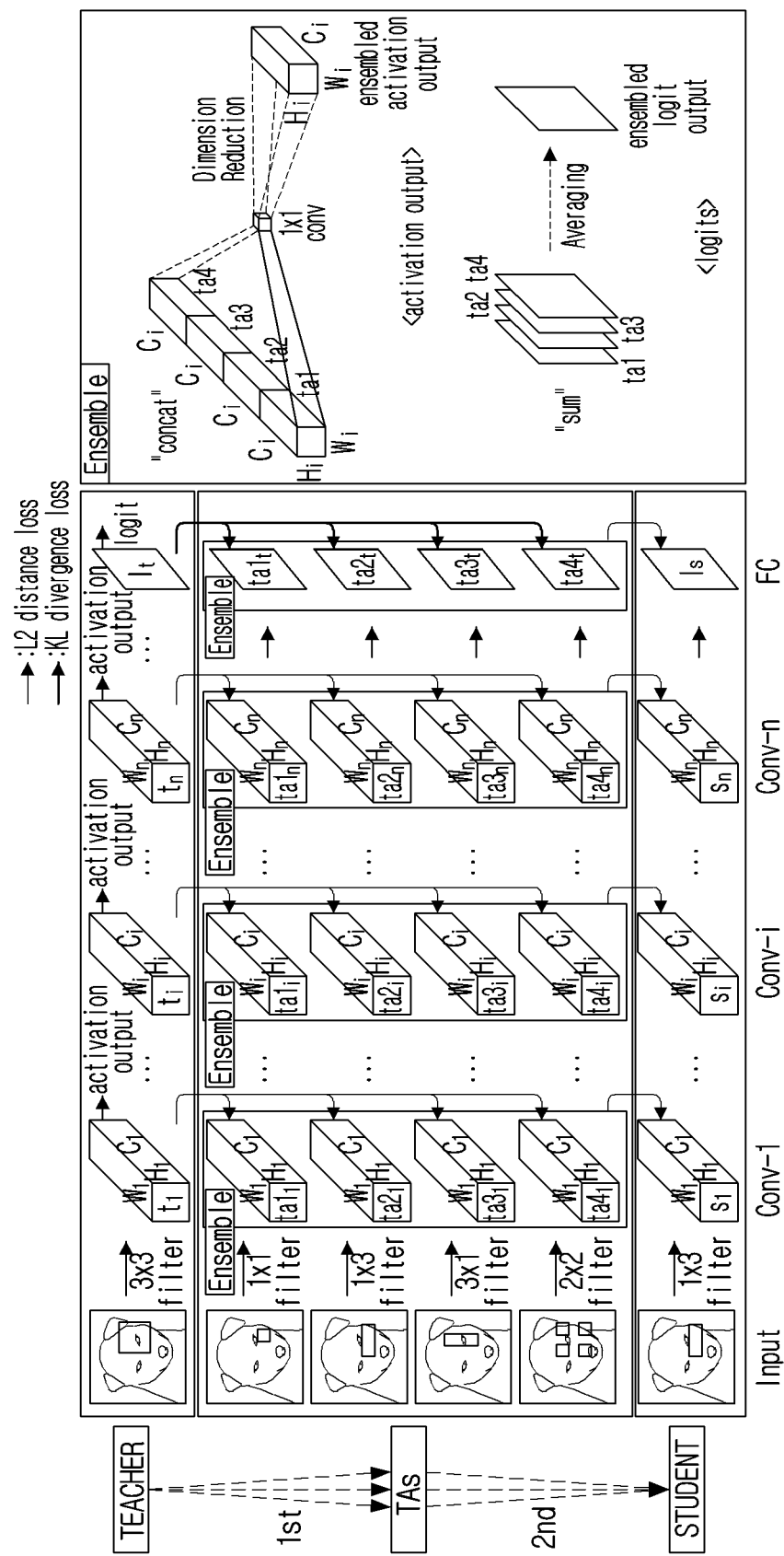

FIGS. 11A and 11B are diagrams illustrating an example parallel retraining method according to various embodiments.

Referring to FIG. 11A, the processor 120 may use the plurality of auxiliary artificial intelligence models TA in parallel. For example, the processor 120 may obtain the second artificial intelligence model to which the feature of the first artificial intelligence model is further reflected, using the plurality of auxiliary artificial intelligence models having different forms of filters.

For example, referring to FIG. 11B, the processor 120 may retrain each of a first auxiliary artificial intelligence model including filters in a form of 1×1, a second auxiliary artificial intelligence model including filters in a form of 1×3, a third auxiliary artificial intelligence model including filters in a form of 3×1, and a fourth auxiliary artificial intelligence model including filters in a form of 2×2. The method for retraining the first to fourth auxiliary artificial intelligence models is obtained by merely applying the method for retraining the second artificial intelligence model in parallel, and therefore the overlapped description will not be repeated.

In this case, a weight value of the auxiliary artificial intelligence model having a form of the filter suitable for the feature of the first artificial intelligence model may be greater than a weight value of the other auxiliary artificial intelligence models. If the filter in a form of 2×2 of the fourth auxiliary artificial intelligence model may reflect the feature of the first artificial intelligence model most excellently, the weight value of the fourth auxiliary artificial intelligence model may be greater than the weight value of the remaining auxiliary artificial intelligence models.

On the other hand, if the auxiliary artificial intelligence model is not used, the filter in a form of 1×3 of the second artificial intelligence model may reflect relatively less feature of the first artificial intelligence model. Accordingly, in a case of using the plurality of auxiliary artificial intelligence models, it is possible to more excellently reflect the feature of the first artificial intelligence model while maintaining the effect of the stepwise retraining as in FIG. 10 in the same manner.

FIG. 11B illustrates that the second artificial intelligence model is retrained by averaging the retrained first to fourth auxiliary artificial intelligence models, but there is no limitation thereto. For example, the processor 120 may retrain the second artificial intelligence model by weight-summing the retrained first to fourth auxiliary artificial intelligence models.

In addition, the processor 120 may use various numbers or various types of auxiliary artificial intelligence models.

Figure 12:
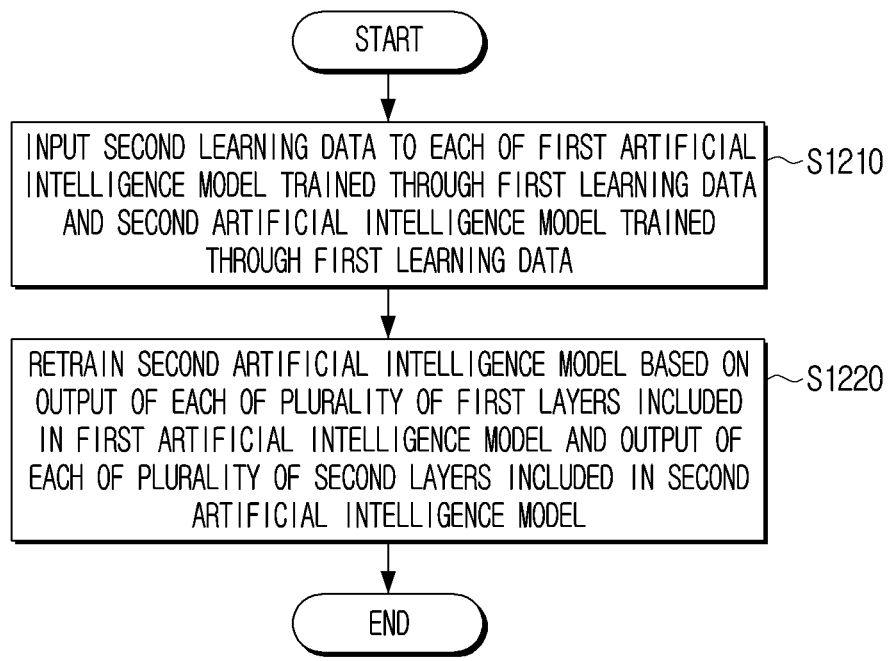
FIG. 12 is a flowchart illustrating an example method for controlling the electronic device according to various embodiments.

FIG. 12 is a flowchart illustrating an example method for controlling an electronic device according to various embodiments.

Second learning data may be input to each of a first artificial intelligence model trained through first learning data and a second artificial intelligence model trained through the first learning data (S1210). The second artificial intelligence model may be retrained based on an output of each of a plurality of first layers included in the first artificial intelligence model and an output of each of a plurality of second layers included in the second artificial intelligence model (S1220). Herein, each of the plurality of first layers includes a plurality of two-dimensional filters, and each of the plurality of second layers may include a plurality of filters having a size reduced from that of the plurality of two-dimensional filters of the corresponding first layer.

In addition, the number of the plurality of first layers may be the same as the number of the plurality of second layers. The retraining (S1220) may include obtaining a plurality of comparison results by comparing the output of each of the plurality of first layers with the output of the corresponding second layer, and retraining the second artificial intelligence model based on the plurality of comparison results.

The number of the plurality of two-dimensional filters included in each of the plurality of first layers may be the same as the number of the plurality of filters included in the corresponding second layer, and the size of the output of each of the plurality of first layers may be the same as the size of the output of the corresponding second layer.

The retraining (S1220) may include inputting the output of each of the plurality of second layers to each third artificial intelligence model, obtaining a plurality of discrimination results for the outputs of the plurality of second layers output from the third artificial intelligence model, and retraining the second artificial intelligence model based on the plurality of comparison results and the plurality of discrimination results, and the third artificial intelligence model may be an artificial intelligence model trained to discriminate the output of each of the plurality of first layers from the output of each of the plurality of second layers.

The method may further include inputting the second learning data to each retrained second artificial intelligence model, and retraining the third artificial intelligence model to discriminate the output of each of the plurality of first layers from an output of each of a plurality of third layers included in the retrained second artificial intelligence model.

The retraining (S1220) may include retraining the second artificial intelligence model by weight-summing of the plurality of comparison results and the plurality of discrimination results.

The retraining (S1220) may include retraining the second artificial intelligence model by applying a weight value of the comparison result corresponding to a final layer among the plurality of first layers to be equal to or greater than weight values of the plurality of comparison results corresponding to remaining layers.

Each of the plurality of filters may be in a form of 1×N or in a form of N×1, and the method may further include reading input data in a row unit or a column unit, and inputting the read input data to the retrained second artificial intelligence model to process the input data.

The first artificial intelligence model and the second artificial intelligence model may be implemented in a form of, for example, and without limitation, a convolutional neural network (CNN).

According to various embodiments of the disclosure described above, the electronic device may retrain a student network by comparing outputs of respective layers of a teacher network and the student network, thereby obtaining an artificial intelligence model in which the low-level feature is highlighted.

The electronic device may obtain an artificial intelligence model in which the low-level feature is further highlighted, by further using a discriminator trained to discriminate the outputs of the respective layers of the teacher network and the student network.

The electronic device may reduce the capacity of the artificial intelligence model and process the input data by the on-the-fly method, using the student network having a size of a filter reduced from that of filters in a two-dimensional form of the teacher network.

According to an embodiment of the disclosure, various embodiments of the disclosure may be implemented as software including instructions stored in machine (e.g., computer)-readable storage media. The machine may include a device which invokes instructions stored in the storage medium and is operated according to the invoked instructions, and may include an electronic device (e.g., electronic device A) according to various embodiments. In a case where the instruction is executed by a processor, the processor may perform a function corresponding to the instruction directly or using other elements under the control of the processor. The instruction may include a code generated by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure described above may be stored in a non-transitory computer-readable medium. When the computer instructions stored in such a non-transitory computer-readable medium are executed by the processor, the computer instructions may enable a specific machine to execute the processing operations according to the embodiments described above. The non-transitory computer-readable medium may refer to a medium that semi-permanently stores data and is readable by a machine. Examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be furthers apparent that various modifications can be made by those having ordinary skill in art, without departing from the true spirit and full scope of the disclosure, including the appended claims.

What is claimed is:

1. An electronic device comprising:
   memory storing information on a first artificial intelligence model trained through first learning data and information on a second artificial intelligence model trained through the first learning data;
   a communication interface; and
   a processor, comprising processing circuitry, connected to the memory and configured to control the electronic device,
   wherein the processor is configured to:
   input second learning data to each of the first artificial intelligence model and the second artificial intelligence model;
   retrain the second artificial intelligence model based on an output of each of a plurality of first layers included in the first artificial intelligence model and an output of each of a plurality of second layers included in the second artificial intelligence model; and
   control the communication interface to transmit the retrained second artificial intelligence model to an external device,
   wherein each of the plurality of first layers comprises a plurality of two-dimensional filters,
   wherein each of the plurality of second layers comprises a plurality of one-dimensional filters having a filter size reduced from each of a plurality of two-dimensional filters of corresponding first layer,
   wherein a number of the plurality of first layers is the same as a number of the plurality of second layers, and
   wherein a number of the plurality of two-dimensional filters included in each of the plurality of first layers is the same as a number of the plurality of one-dimensional filters included in the corresponding second layer,
   wherein each of the plurality of one-dimensional filters is in a form of 1×N or in a form of N×1, and
   wherein the processor is configured to:
   read input data from the memory in a row unit or a column unit; and
   input the read input data to the retrained second artificial intelligence model to process the input data.

2. The device according to claim 1,
   wherein the processor is configured to:
   obtain a plurality of comparison results by comparing the output of each of the plurality of first layers with the output of each corresponding second layer; and
   retrain the second artificial intelligence model based on the plurality of comparison results.

3. The device according to claim 2, wherein a size of the output of each of the plurality of first layers is the same as a size of the output of the corresponding second layer.

4. The device according to claim 3, wherein the memory stores information on a third artificial intelligence model trained to discriminate the output of each of the plurality of first layers from the output of each of the plurality of second layers, and
   wherein the processor is configured to:
   input the output of each of the plurality of second layers to each third artificial intelligence model;
   obtain a plurality of discrimination results for the outputs of the plurality of second layers output from the third artificial intelligence model; and
   retrain the second artificial intelligence model based on the plurality of comparison results and the plurality of discrimination results.

5. The device according to claim 4, wherein the processor is configured to:
   input the second learning data to each retrained second artificial intelligence model; and
   retrain the third artificial intelligence model to discriminate the output of each of the plurality of first layers from an output of each of a plurality of third layers included in the retrained second artificial intelligence model.

6. The device according to claim 4, wherein the processor is configured to retrain the second artificial intelligence model by weight-summing the plurality of comparison results and the plurality of discrimination results.

7. The device according to claim 6, wherein the processor is configured to retrain the second artificial intelligence model by applying a weight value of a comparison result corresponding to a final layer among the plurality of first layers to be equal to or greater than weight values of the plurality of comparison results corresponding to remaining layers.

8. The device according to claim 1, wherein the first artificial intelligence model and the second artificial intelligence model comprise a convolutional neural network (CNN).

9. The device according to claim 1, wherein the memory further stores information on an auxiliary artificial intelligence model trained through the first learning data, and
wherein the processor is configured to:
input the second learning data to the auxiliary artificial intelligence model;
retrain the auxiliary artificial intelligence model based on the output of each of the plurality of first layers and an output of each of a plurality of auxiliary layers included in the auxiliary artificial intelligence model;
input the second learning data to the retrained auxiliary artificial intelligence model; and
retrain the second artificial intelligence model based on the output of each of the plurality of auxiliary layers included in the retrained auxiliary artificial intelligence model and the output of each of the plurality of second layers, and
wherein each of the plurality of auxiliary layers comprises a plurality of filters having a filter size reduced from each of the plurality of two-dimensional filters of the corresponding first layer.

10. The device according to claim 9, wherein the memory further stores information on a first auxiliary artificial intelligence model trained through the first learning data and information on a second auxiliary artificial intelligence model trained through the first learning data,
wherein the processor is configured to:
input the second learning data to the first auxiliary artificial intelligence model and the second auxiliary artificial intelligence model;
retrain the first auxiliary artificial intelligence model based on the output of each of the plurality of first layers and an output of each of a plurality of first auxiliary layers included in the first auxiliary artificial intelligence model;
retrain the second auxiliary artificial intelligence model based on the output of each of the plurality of first layers and an output of each of a plurality of second auxiliary layers included in the second auxiliary artificial intelligence model;
input the second learning data to the retrained first auxiliary artificial intelligence model and the retrained second auxiliary artificial intelligence model; and
retrain the second artificial intelligence model based on the output of each of the plurality of first auxiliary layers included in the retrained first auxiliary artificial intelligence model, the output of each of the plurality of second auxiliary layers included in the retrained second auxiliary artificial intelligence model, and the output of each of the plurality of second layers,
wherein each of the plurality of first auxiliary layers comprises a plurality of filters having a filter size reduced from each of the plurality of two-dimensional filters of the corresponding first layer,
wherein each of the plurality of second auxiliary layers comprises a plurality of filters having a filter size reduced from each of the plurality of two-dimensional filters of the corresponding first layer, and
wherein each of the plurality of filters included in each of the plurality of first auxiliary layers has a form different from the filter included in each of the corresponding second auxiliary layer.

11. A method for controlling an electronic device, the method comprising:
inputting second learning data to each of a first artificial intelligence model trained through first learning data and a second artificial intelligence model trained through the first artificial intelligence model;
retraining the second artificial intelligence model based on an output of each of a plurality of first layers included in the first artificial intelligence model and an output of each of a plurality of second layers included in the second artificial intelligence model;
transmitting the retrained second artificial intelligence model to an external device;
reading input data from memory in a row unit or a column unit; and
inputting the read input data to the retrained second artificial intelligence model to process the input data,
wherein each of the plurality of first layers comprises a plurality of two-dimensional filters,
wherein each of the plurality of second layers comprises a plurality of one-dimensional filters having a filter size reduced from each of the plurality of two-dimensional filters of the corresponding first layer,
wherein a number of the plurality of first layers is the same as a number of the plurality of second layers, and
wherein a number of the plurality of two-dimensional filters included in each of the plurality of first layers is the same as a number of the plurality of one-dimensional filters included in the corresponding second layer,
wherein each of the plurality of one-dimensional filters is in a form of 1×N or in a form of N×1.

12. The method according to claim 11,
wherein the retraining comprises:
obtaining a plurality of comparison results by comparing the output of each of the plurality of first layers with the output of the corresponding second layer; and
retraining the second artificial intelligence model based on the plurality of comparison results.

13. The method according to claim 12, wherein a size of the output of each of the plurality of first layers is the same as a size of the output of the corresponding second layer.

14. The method according to claim 13, wherein the retraining comprises:
inputting the output of each of the plurality of second layers to each third artificial intelligence model;
obtaining a plurality of discrimination results for the outputs of the plurality of second layers output from the third artificial intelligence model; and retraining the second artificial intelligence model based on the plurality of comparison results and the plurality of discrimination results, and
wherein the third artificial intelligence model is an artificial intelligence model trained to discriminate the output of each of the plurality of first layers from the output of each of the plurality of second layers.

* * * * *